United States Patent
Sugaya

(10) Patent No.: US 8,335,531 B2
(45) Date of Patent: *Dec. 18, 2012

(54) WIRELESS COMMUNICATION DEVICE, WIRELESS COMMUNICATION METHOD, AND COMPUTER PROGRAM

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/801,056

(22) Filed: May 19, 2010

(65) Prior Publication Data

US 2010/0226258 A1 Sep. 9, 2010

Related U.S. Application Data

(62) Division of application No. 11/417,124, filed on May 4, 2006, now Pat. No. 7,751,840.

(30) Foreign Application Priority Data

May 6, 2005 (JP) ................ P2005-135224

(51) Int. Cl.
*H04B 1/38* (2006.01)
*H04B 7/00* (2006.01)
*H04L 12/58* (2006.01)
*H04M 1/00* (2006.01)
*H04W 72/00* (2009.01)

(52) U.S. Cl. .............. 455/517; 455/412.1; 455/550.1; 455/452.1; 455/556.1; 455/557

(58) Field of Classification Search ............. 455/517, 455/412.1, 550.1, 452.1, 556.1, 557
See application file for complete search history.

(56) References Cited

U.S. PATENT DOCUMENTS

| 6,907,258 B2 * | 6/2005 | Tsutsumi et al. ............. 455/512 |
| 7,263,361 B2 | 8/2007 | Taylor |
| 7,412,250 B2 * | 8/2008 | Fukuda ......................... 455/502 |
| 7,602,764 B2 | 10/2009 | Matsunaga et al. |
| 2004/0162059 A1 * | 8/2004 | Hiltunen et al. ........... 455/412.1 |
| 2004/0246993 A1 | 12/2004 | An |
| 2005/0195771 A1 * | 9/2005 | Matsunaga et al. ........... 370/336 |

(Continued)

FOREIGN PATENT DOCUMENTS

| JP | 2000-165930 | 6/2000 |
| JP | 2004-503168 | 1/2004 |
| JP | 2004-228926 | 8/2004 |
| WO | WO 2004/102887 | 11/2004 |

OTHER PUBLICATIONS

Office Action issued by the Japan Patent Office in corresponding Japanese Patent Application No. JP 2005-135224 on Nov. 16, 2010.

*Primary Examiner* — Bobbak Safaipour

(74) *Attorney, Agent, or Firm* — Finnegan, Henderson, Farabow, Garrett & Dunner, L.L.P.

(57) ABSTRACT

An own-group storage area in which beacon information concerning a group of the own device is stored and an other-groups storage area in which beacon information concerning other groups different from the group of the own device is stored are allocated to a memory area of a wireless communication device in a network. The wireless communication device includes storage means for storing the beacon information concerning the other groups in the own-group storage area and the other-groups storage area in the same structure as that of the beacon information concerning the group of the own device.

8 Claims, 11 Drawing Sheets

U.S. PATENT DOCUMENTS

| | | | |
|---|---|---|---|
| 2005/0249173 A1* | 11/2005 | Salokannel et al. | 370/338 |
| 2006/0114757 A1 | 6/2006 | Theimer et al. | |
| 2006/0242473 A1* | 10/2006 | Wahl et al. | 714/700 |
| 2007/0274206 A1* | 11/2007 | Habetha et al. | 370/222 |
| 2008/0192690 A1* | 8/2008 | Laroia et al. | 370/330 |
| 2008/0259877 A1* | 10/2008 | Habetha | 370/336 |

* cited by examiner

FIG. 5

| BEACON SLOT (501) | DEVICE INDEX (502) | BEACON STATUS (503) | BEACON SLOT INFORMATION (504) | LOST BEACON (505) | HEADER — DEVICE ADDRESS (506) | BEACON PARAMETER — DEVICE IDENTIFIER (507) | BSN (508) | CONTROL INFORMATION (509) | RECEIVED ID BITMAP (510) | IE PARAMETER — BPOIE (511) | CAPABILITY (512) | ... |
|---|---|---|---|---|---|---|---|---|---|---|---|---|
| 0 | N/A | Non | Idle | Counter | N/A | N/A | N/A | N/A | IE Bitmap | Content | Content | ... |
| 1 | DI=2 | Rx | Occupied | Counter | DEVID7 | MAC Address | BSN1 | Normal | IE Bitmap | Content | Content | ... |
| 2 | N/A | Used | Occupied | Counter | DEVID5 | N/A | Slot No. | N/A | IE Bitmap | Content | Content | ... |
| 3 | DI=1 | Rx | Occupied | Counter | DEVID2 | MAC Address | BSN3 | N/A | IE Bitmap | Content | Content | ... |
| 4 | DI=4 | Used | Occupied | Counter | DEVID4 | MAC Address | Slot No. | N/A | IE Bitmap | Content | Content | ... |
| 5 | N/A | Used | Occupied | Counter | DEVID6 | MAC Address | Slot No. | N/A | IE Bitmap | Content | Content | ... |
| 6 | DI=3 | Used | Occupied | Counter | DEVID1 | MAC Address | Slot No. | N/A | IE Bitmap | Content | Content | ... |
| 7 | Own Tx | Used | Occupied | Counter | DEVID3 | Own Address | BSN7 | Normal | IE Bitmap | Content | Content | ... |
| 8 | N/A | Non | Idle | Counter | N/A | N/A | N/A | N/A | IE Bitmap | Content | Content | ... |
| ... | ... | ... | ... | ... | ... | ... | ... | ... | ... | ... | ... | ... |
| X-1 | N/A | Non | Idle | Counter | N/A | N/A | Slot No. | N/A | IE Bitmap | Content | Content | ... |
| X | N/A | Non | Idle | Counter | N/A | N/A | Slot No. | N/A | IE Bitmap | Content | Content | ... |

FIG. 6

| BEACON SLOT | DEVICE INDEX | BEACON STATUS | MAS INFORMATION ON OTHER GROUPS | LOST BEACON | HEADER | | BEACON PARAMETER | | | RECEIVED ID BITMAP | IE PARAMETER | |
|---|---|---|---|---|---|---|---|---|---|---|---|---|
| | | | | | DEVICE ADDRESS | DEVICE IDENTIFIER | BSN | CONTROL INFORMATION | | | BPOIE | BPO CAPABILITY |
| 601 | 602 | 603 | 604 | 605 | 606 | 607 | 608 | 609 | | 610 | 611 | 612 |
| X+1 | DI=5 | Rx | 125 MAS | Counter | DEVID8 | MAC Address | Other2 | Normal | | IE Bitmap | Content | Content |
| X+2 | N/A | Non | MAS No. | Counter | N/A | N/A | Slot No. | N/A | | IE Bitmap | Content | Content |
| ... | ... | ... | ... | ... | ... | ... | ... | ... | | ... | ... | ... |
| Y−1 | N/A | Non | MAS No. | Counter | N/A | N/A | Slot No. | N/A | | IE Bitmap | Content | Content |
| Y | N/A | Non | MAS No. | Counter | N/A | N/A | Slot No. | N/A | | IE Bitmap | Content | Content |

FIG. 7

| 701 DEVICE INDEX | 702 DI STATUS | 703 DEVICE ADDRESS | 704 TRANSMISSION DATA BUFFERING | 705 AVAILABLE MAS | 706 RESERVED MAS | 707 PCA ENABLED MAS BITMAP | 708 AVAILABLE RATE | 709 HIBERNATION COUNT | 710 HIBERNATION PERIOD | ... |
|---|---|---|---|---|---|---|---|---|---|---|
| 1 | Enable | DEVID2 | Frames | Bitmap | Bitmap | Availability | PHY Rate | SF Counter | Num of SF | ... |
| 2 | Enable | DEVID7 | Frames | Bitmap | Bitmap | Availability | PHY Rate | SF Counter | Num of SF | ... |
| 3 | Enable | DEVID1 | Frames | Bitmap | Bitmap | Availability | PHY Rate | SF Counter | Num of SF | ... |
| 4 | Enable | DEVID4 | Frames | Bitmap | Bitmap | Availability | PHY Rate | SF Counter | Num of SF | ... |
| 5 | Enable | DEVID8 | Frames | Bitmap | Bitmap | Availability | PHY Rate | SF Counter | Num of SF | ... |
| 6 | Disable | N/A | N/A | Bitmap | Bitmap | Availability | PHY Rate | SF Counter | Num of SF | ... |
| 7 | Disable | N/A | N/A | ... | ... | ... | ... | ... | ... | ... |
| ... | ... | ... | ... | ... | ... | ... | ... | ... | ... | ... |
| Z-1 | Disable | N/A | N/A | Bitmap | Bitmap | Availability | PHY Rate | SF Counter | Num of SF | ... |
| Z | Disable | N/A | N/A | Bitmap | Bitmap | Availability | PHY Rate | SF Counter | Num of SF | ... |

WIRELESS COMMUNICATION DEVICE, WIRELESS COMMUNICATION METHOD, AND COMPUTER PROGRAM

CROSS REFERENCES TO RELATED APPLICATIONS

This is a divisional of application Ser. No. 11/417,124, filed May 4, 2006 now U.S. Pat. No. 7,751,840 and currently allowed. Application Ser. No. 11/417,124 claims priority to Japanese Patent Application JP 2005-135224 filed in the Japanese Patent Office on May 06, 2005. All of the applications are incorporated herein by reference in their entirety.

BACKGROUND OF THE INVENTION

1. Field of the Invention

The present invention relates to a communication device capable of wireless communication.

2. Description of the Related Art

Communication systems capable of network connection by wireless communication between multiple communication devices, such as computer devices having communication functions, have become popular as information processing technologies have become more advanced.

Such communication systems are specified in, for example, Institute of Electrical and Electronic Engineers (IEEE) 802.11 (for example, refer to International Standard ISO/IEC 8802-11:1999(E) ANSI/IEEE Std 802.11, 1999 Edition, Part II: Wireless LAN Medium Access Control (MAC) and Physical Layer (PHY) Specifications) and IEEE 802.15.3.

"Ad hoc networks" over which communication devices directly and asynchronously perform the wireless communication have been developed as one type of networks utilizing the above communication systems. The ad hoc communication systems have no control station and are suitable for, for example, home networks including household electric appliances (for example, refer to Japanese Unexamined Patent Application Publication No. 2000-165930).

In order to detect wireless communication devices around the own device and to know the behaviors of the wireless communication devices, such an ad hoc networks employs a method of defining a time area in a predetermined superframe as a beacon period between the wireless communication devices belonging to the network group of the own device and sharing the timings in the beacon period between the wireless communication devices belonging to the network group to ensure connection between the wireless communication devices belonging to the network group.

In the above ad hoc network, it is important to set the timings in the beacon period defined between the wireless communication devices in the network group of the own device such that the beacon transmission positions (beacon slots) of the own device do not coincide with the beacon transmission positions of other wireless communication devices.

Since the beacons communicated between the wireless communication devices in the network group of the own device are concentrated on one time in the beacon period, there is a need to manage the beacon periods to determine all the wireless communication devices in the network.

SUMMARY OF THE INVENTION

Although it is necessary to manage the beacons of wireless communication devices that belong to network groups different from the network group of the own device and that enter the network, along the beacon periods of the wireless communication devices in the network group of the own device, in the configuration of the above ad hoc network, it is difficult to manage such beacons because management means for collectively managing such beacons does not exist.

Specifically, when multiple network groups enter the network, it is necessary to collectively manage the beacon periods of the wireless communication devices in the network group of own device and the beacon periods of the wireless communication devices in other network groups and to store the beacon information concerning the wireless communication devices in the network group of the own device and the beacon information concerning the wireless communication devices in the network groups different from the network group of the own device in the memory areas of the respective wireless communication devices. However, such storage means does not disadvantageously exit.

It is desirable to provide a new and improved wireless communication device, wireless communication method, and computer program, which are capable of storing beacon information concerning the beacon period of the own device and beacon information concerning beacon periods different from that of the own device.

According to an embodiment of the present invention, there is provided a wireless communication device in a network. An own-group storage area in which beacon information concerning a group of the own device is stored and an other-groups storage area in which beacon information concerning other groups different from the group of the own device is stored are allocated to a memory area of the own device. The wireless communication device includes storage means for storing the beacon information concerning the other groups in the own-group storage area and the other-groups storage area in the same structure as that of the beacon information concerning the group of the own device. With this structure, the wireless communication device can collectively manage the beacon information concerning the group of the own device and the beacon information concerning other groups different from the group of the own device to appropriately communicate with destination communication devices.

The other-groups storage area may be allocated to a memory area behind the memory area of the own-group storage area.

When the beacon information is stored, the storage means may determine a maximum number of counted communication devices in the network and may sequentially store the beacon information of a number corresponding to the maximum number of counted communication devices, concerning the other groups, from the end of the own-group storage area.

The wireless communication device may include management means for allocating device-specific information unique to each wireless communication device around the own device to manage the wireless communication devices, which are destination devices, by using the device-specific information.

It is possible that the device-specific information does not depend on a beacon transmission position and a device address and has a minimum length.

According to another embodiment of the present invention, a wireless communication device in a network includes a storage unit configured to store beacon information resulting from initial scanning in the same structure as that of normal beacon information yielded in operation of the network in a memory area of the own device. With this structure, since the wireless communication device manages the beacon information in the same structure even in the initial scanning, it is possible to discriminate the beacon information concerning the group of the own device from the beacon information concerning other groups different from the group of the own device after several superframe periods to individually and easily mange the beacon information.

According to yet another embodiment of the present invention, a wireless communication device in a network includes scanning setup means for performing scanning at arbitrary timings, in addition to initial scanning; detecting means for detecting a wireless communication device having a different beacon period; and memory means for storing beacon information concerning the wireless communication device having the different beacon period in a memory area.

The wireless communication device may further include calculating means for calculating a timing at which a reserved communication area is set from at least the beacon information stored in the memory means; comparing means for comparing the timing of the calculated reserved communication area with the timing of the reserved communication area of the own device; and setting means for setting the communication areas such that the timings of the communication areas do not coincide with each other, in accordance with the comparison result.

The wireless communication device may further include storage means for storing the beacon information in other beacon periods in the same structure as that of the beacon information concerning a wireless communication device having the beacon period of the own device, stored in the memory area in the memory means.

The beacon information resulting from the initial scanning may be stored in the same structure as that of the beacon information concerning the wireless communication device having the beacon period of the own device in the memory area in the memory means.

The wireless communication device may further include setting means, for setting a maximum number of counted communication devices in the network. The storage means may sequentially store the beacon information concerning the wireless communication device having a beacon period different from the beacon period of the own device from the end of the area where the beacon information in the beacon period of the own device is stored.

The wireless communication device may further include allocating means for allocating a device identifier specific to each wireless communication device around the own device; and managing means for managing the wireless communication devices around the own device, which are destination devices, by using the device identifier.

According to still another embodiment of the present invention, a wireless communication method for a wireless communication device in a network includes the steps of performing scanning at arbitrary timings, in addition to initial scanning; detecting a wireless communication device having a different beacon period; and storing beacon information concerning the wireless communication device having the different beacon period in a memory area. According to still yet another embodiment of the present invention, a computer-executable program causing a computer to function as a wireless communication device in a network includes instructions for performing scanning at arbitrary timings, in addition to initial scanning; instructions for detecting a wireless communication device having a different beacon period; and instructions for storing beacon information concerning the wireless communication device having the different beacon period in a memory area.

As described above, according to the present invention, both the area in which the beacon information concerning the group of the own device is stored and the area in which the beacon information concerning other groups is stored are provided to manage the multiple network groups around the own device.

BRIEF DESCRIPTION OF THE DRAWINGS

FIG. 5 is a diagram schematically showing an example of the structure of a memory area in a memory in which beacon information concerning the network group of the own device is stored, according to an embodiment of the present invention;

FIG. 6 is a diagram schematically showing an example of the structure of a memory area in the memory, in which beacon information concerning other network groups is stored, according to an embodiment of the present invention;

FIG. 7 is a diagram schematically showing an example of the management structure of a communication device by using device-specific information, according to an embodiment of the present invention;

DESCRIPTION OF THE PREFERRED EMBODIMENTS

Figure 1:
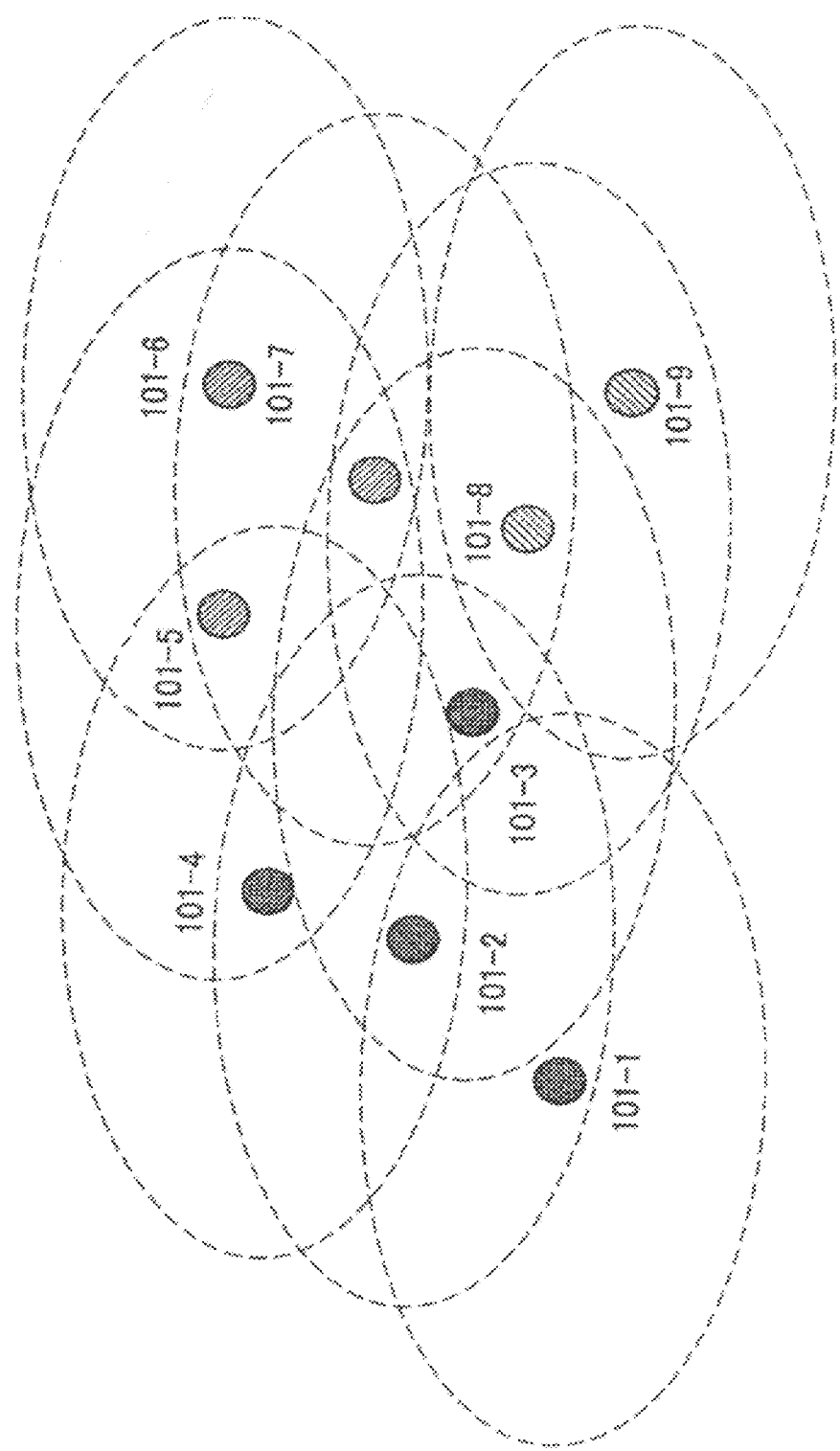
FIG. 1 is a diagram schematically showing an example of the configuration of a wireless ad hoc network by autonomous distributed control, according to the embodiment of the present invention.

Embodiments of the present invention will be described with reference to the attached drawings. The same reference numerals are used in the following description and the attached drawings to identify the components having approximately the same functions and structures. A description of such components is not repeated herein.

FIG. 1 is a diagram schematically showing an example of the configuration of a wireless ad hoc network by autonomous distributed control, according to an embodiment of the present invention.

Referring to FIG. 1, a communication device 101-1 is capable of wireless communication with a communication device 101-2 located within the radio wave spectrum (denoted by a broken line) around the communication device 101-1.

The communication device 101-2 is capable of the wireless communication with the communication device 101-1 and communication devices 101-3 and 101-4, which are located within the radio wave spectrum (denoted by a broken line) around the communication device 101-2.

The communication device 101-3 is capable of the wireless communication with the communication device 101-2 and communication devices 101-7 and 101-8, which are located within the radio wave spectrum (denoted by a broken line) around the communication device 101-3.

The communication device 101-4 is capable of the wireless communication with the communication device 101-2 and a communication device 101-5, which are located within the radio wave spectrum (denoted by a broken line) around the communication device 101-4.

The communication device 101-5 is capable of the wireless communication with the communication devices 101-4, a communication device 101-6, and the communication device 101-7, which are located within the radio wave spectrum (denoted by a broken line) around the communication device 101-5.

The communication device 101-6 is capable of the wireless communication with the communication devices 101-5 and 101-7, which are located within the radio wave spectrum (denoted by a broken line) around the communication device 101-6.

The communication device 101-7 is capable of the wireless communication with the communication devices 101-3, 101-5, 101-6, and 101-8, which are located within the radio wave spectrum (denoted by a broken line) around the communication device 101-7.

The communication device 101-8 is capable of the wireless communication with the communication devices 101-3 and 101-7 and a communication device 101-9, which are located within the radio wave spectrum (denoted by a broken line) around the communication device 101-8.

The communication device 101-9 is capable of the wireless communication with the communication device 101-8 located within the radio wave spectrum (denoted by a broken line) around the communication device 101-9.

The communication devices 101-1, 101-2, 101-3, and 101-4 form a first network group. The communication devices 101-1 to 101-4 are shown with first hatching.

The communication devices 101-5, 101-6, and 101-7 form a second network group. The communication devices 101-5 to 101-7 are shown with second hatching.

The communication devices 101-8 and 101-9 form another network group different from the first and second network groups. The communication devices 101-8 to 101-9 are shown with third hatching.

The communication device 101-4 in the first network group and the communication device 101-5 in the second network group receive beacon signals from communication devices belonging to the network groups different from each other.

The communication device 101-3 in the first network group and the communication device 101-7 in the second network group also receive beacon signals from communication devices belonging to the network groups different from each other.

The first network group and the second network group achieve the coexistence by sharing one beacon period.

In other words, the first network group and the second network group form one large network group.

The communication device 101-8, which belongs to a network group different from the first and second network groups, is located at a position where the communication device 101-8 is capable of communication with the communication devices 101-3 and 101-7.

Since the communication device 101-8 has a beacon period different from those of the first and second network groups, the communication device 101-8 does not transmit beacons in the beacon period common to the first and second network groups.

There are cases where the communication devices 101-1 to 101-9 are simply and collectively referred to as a communication device 101 in this specification. In such a case, the communication device 101 corresponds to at least one of the communication devices 101-1 to 101-9.

Figure 2:
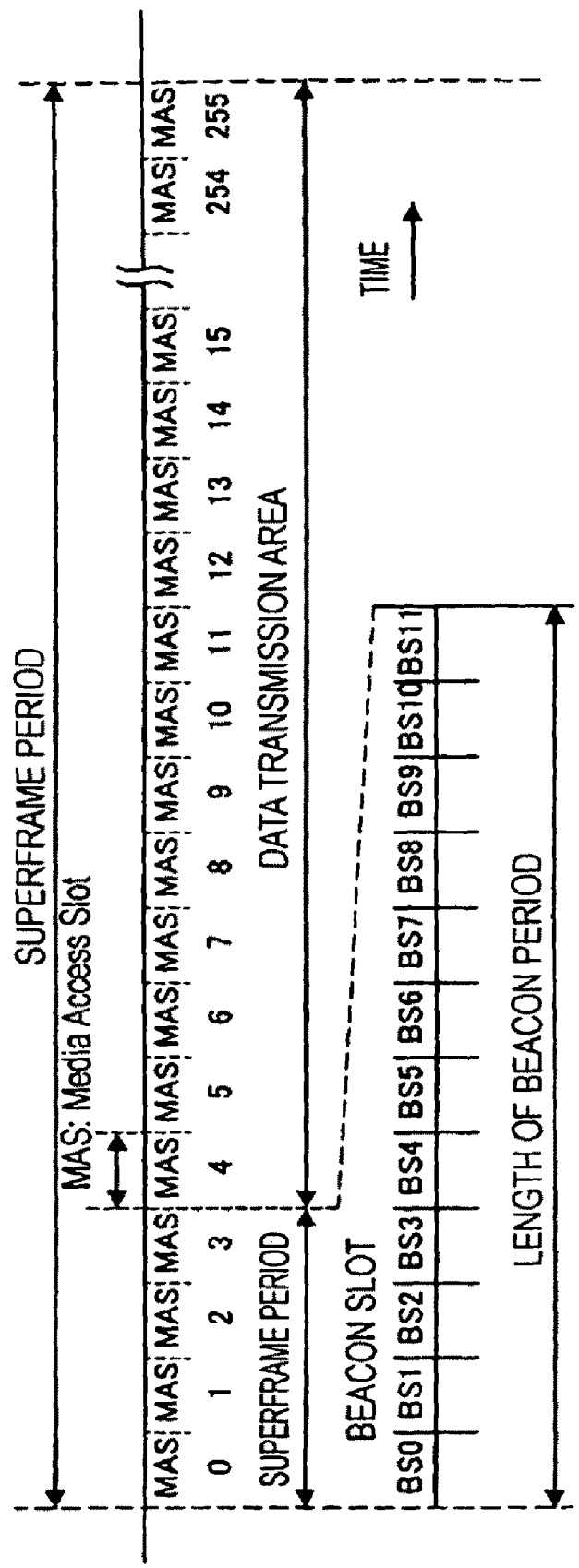
FIG. 2 is a diagram schematically showing the structure of a superframe according to an embodiment of the present invention.

FIG. 2 is a diagram schematically showing the structure of a superframe according to an embodiment of the present invention.

A superframe period over a predetermined time is defined in a manner shown in FIG. 2. The superframe period is divided into 256 media access slots (MASS), such as "MAS0" to "MAS255".

The superframe includes a beacon period serving as a management area and a data transmission area, as shown in FIG. 2.

The beacon period has beacon slots set therein at predetermined intervals. Each communication device 101 uses its own beacon slot to transmit and receive beacons to and from the communication devices 101 around the own device (the communication device 101 itself) in order to exchange parameters between the communication devices 101.

The length of the beacon period depends on the number of the communication devices 101 around the own device. That is, the number of the communication devices 101 determines a required length of the beacon period.

According to the embodiment of the present invention, the MASs from the MAS0 to the MAS3 are used as the beacon period, as shown in FIG. 2. The beacon period has a total of 12 beacon slots from a beacon slot 0 (BS0) to a beacon slot 11 (BS11).

Figure 3:
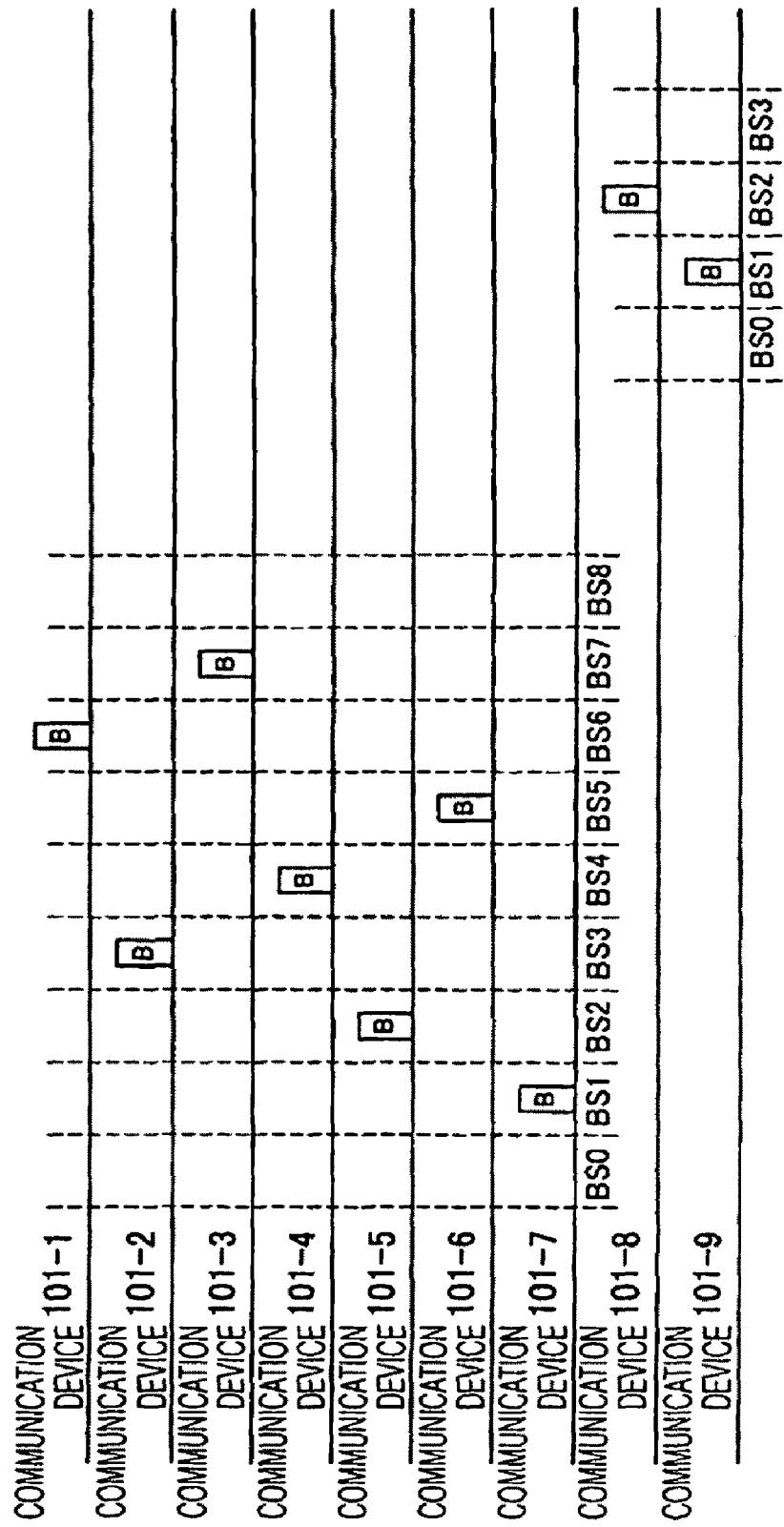
FIG. 3 is a diagram schematically showing use of beacon slots according to an embodiment of the present invention.

FIG. 3 is a diagram schematically showing use of the beacon slots in each communication device 101 according to an embodiment of the present invention.

Each communication device 101 in one network group indicates unused beacon slots to the communication devices 101 around the own device to show the beacon slot selected by the own device. FIG. 3 also shows how to share a common beacon period between the communication devices 101 around the own device, irrespective of the network group.

The communication device 101-1 in the first network group transmits its own beacon in the beacon slot 6 (BS6).

The communication device 101-2 in the first network group transmits its own beacon in the beacon slot 3 (BS3), and the communication device 101-3 in the first network group transmits its own beacon in the beacon slot 7 (BS7).

The communication device 101-4 in the first network group transmits its own beacon in the beacon slot 4 (BS4).

The communication device 101-5 in the second network group transmits its own beacon in the beacon slot 2 (BS2), and the communication device 101-6 in the second network group transmits its own beacon in the beacon slot 5 (BS5).

The communication device 101-7 in the second network group transmits its own beacon in the beacon slot 1 (BS1).

Although the beacon slot 0 (BS0) and the beacon slot 8 (BS8) are provided, if necessary, in preparation for new communication devices 101 that enter other network groups different from the first and second network groups, the embodiment of the present invention is not limited to this case.

As shown in FIG. 3, the communication device 101-8 belonging to another network group transmits its own beacon in the beacon slot 2 (BS2) in the beacon period of the other network group, and the communication device 109 transmits its own beacon in the beacon slot (BS1) in this beacon period.

Similarly, although the beacon slot (BS0) and the beacon slot 3 (BS3) are provided, if necessary, in preparation for new communication devices 101 that enter the other network group, the embodiment of the present invention is not limited to this case.

Figure 4:
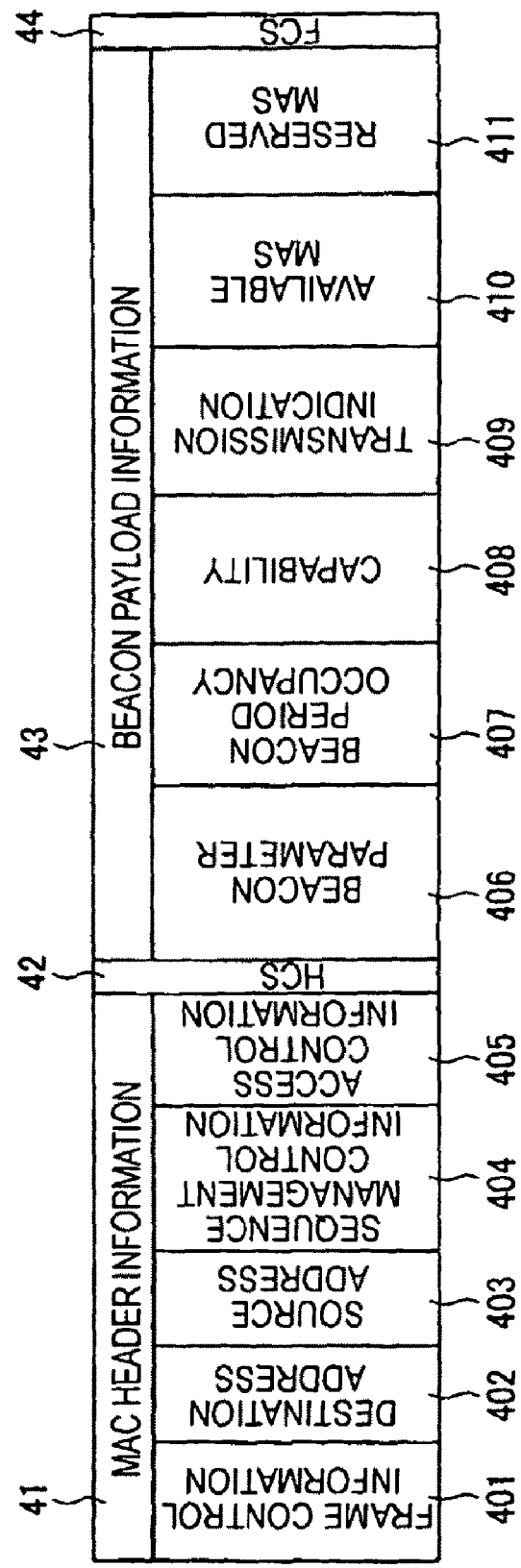
FIG. 4 is a diagram schematically showing the structure of a beacon frame according to an embodiment of the present invention.

FIG. 4 is a diagram schematically showing an example of the structure of a beacon frame according to the embodiment of the present invention.

Since the beacon frame is transmitted from each communication device 101 in the management area (beacon period) of the superframe, each communication device 101 can receive all the beacons transmitted from the communication devices in the management area (beacon period) to exchange the parameters between the communication devices 101 around the own device.

As shown in FIG. 4, the beacon frame includes MAC header information 41, a header check sequence (HCS) 42, beacon payload information 43, and a frame check sequence (FCS) 44.

The MAC header information 41 includes frame control information 401, a destination address 402, a source address 403, sequence management control information 404, and access control information 405.

Information processing over a radio communication network is collectively called "Access". The information processing includes connection between the communication devices 101, reference to information owned by another communication device 101 from the communication device 101, and storage, deletion, or modification of information owned by another communication device 101 from the communication device 101.

The beacon payload information 43 includes a beacon parameter 406, beacon period occupancy 407, a capability 408 of the communication device 101, transmission indication 409, an available MAS 410, and a reserved MAS 411.

FIG. 5 is a diagram schematically showing an example of the structure of a memory area in a memory (storage unit), in which beacon information concerning the network group of the own device is stored, according to an embodiment of the present invention.

The memory area in the memory, shown in FIG. 5, includes the beacon information concerning one or more network groups operating in the beacon period of the own device.

Specifically, the beacon information concerning the first and second network groups, which have the same beacon period, is stored in the memory.

The beacon information that is received is stored in the memory for every beacon slot position 501.

The memory area in the memory includes a device index 502, a beacon status 503, beacon slot information 504, the number of lost beacons 505, a device address 506, a device identifier 507, a beacon slot number (BSN) 508, control information 509, a received information element (IE) bitmap 510, a beacon period occupancy information element (BPOIE) 511, and capability 512 of each beacon slot position 501. The device index 502 indicates information specific to the communication device. The beacon status 503 indicates whether the beacon information is received in the beacon slot. The beacon slot information 504 indicates the usage of the beacon slot in the beacon period. The number of lost beacons 505 indicates a counted number of beacons that are temporarily lost.

The device address 506 described in a header in FIG. 5, and the device identifier 507 being information concerning the MAC address, the BSN 508, and the control information 509, which are described in a beacon parameter in FIG. 5, are arranged as common information concerning the received beacon.

Furthermore, the received IE bitmap 510 indicating which information element is included; the BPOIE 511 indicating the usage of the beacon period; and the capability 512, which is the information element indicating the capability of the communication device 101, are arranged, if necessary, in an area (as IE parameters of the received beacon), in which parameters added as variable length information are stored. The BPOIE 511 and the capability 512 show the content of the information element described in the received IE bitmap 510. However, the above information is only exemplified and other beacon parameter information may also be arranged.

The information concerning the communication device 101-3 (DEVID 3) is stored in the memory on the basis of the parameters, for example, in the structure shown in FIG. 5. The received beacon information is stored in the memory as the information in the beacon period of the own device.

As shown in FIG. 5, since the beacon slot 1 (BSN1) receives the beacon of the communication device 101-7 (DEVID 7), the beacon slot 1 (BSN1) has the parameters of the communication device 101-7 and DI=2 is assigned as the device index 502.

Since, although the beacon slot 2 (BSN2) does not receive the beacon, it is determined that the communication device 101-5 (DEVID 5) uses the beacon slot 2 (BSN2) from the BPOIE indication from the communication device 101-7, the parameters concerning the communication device 101-5 are described in the beacon slot 2 (BSN2).

Since the beacon slot 3 (BSN3) receives the beacon of the communication device 101-2 (DEVID 2), the beacon slot 3 (BSN3) has the parameters of the communication device 101-2 and DI=1 is assigned as the device index 502.

Since, although the beacon slot 4 (BSN4) does not receive the beacon, it is determined that the communication device 101-4 (DEVID 4) uses the beacon slot 4 (BSN5) from the BPOIE indication from the communication device 101-2, the parameters concerning the communication device 101-4 are described in the beacon slot 4 (BSN4). In addition, since the communication device 101-4 belongs to the first network group, DI=4 is assigned as the device index 502.

Since, although the beacon slot 5 (BSN5) does not receive the beacon, it is determined that the communication device 101-6 (DEVID 6) uses the beacon slot 6 (BSN6) from the BPOIE indication from the communication device 101-7, the parameters concerning the communication device 101-6 are described in the beacon slot 5 (BSN5).

Since, although the beacon slot 6 (BSN6) does not receive the beacon, it is determined that the communication device 101-1 (DEVID 1) uses the beacon slot 6 (BSN6) from the BPOIE indication from the communication device 101-2, the parameters concerning the communication device 101-1 are described in the beacon slot 6 (BSN6). In addition, since the communication device 101-1 belongs to the first network group, DI=3 is assigned as the device index 502.

Since the beacon slot 7 (BSN7) is assigned as the beacon slot for transmission from the own device, the parameters including its own address are described in the items for the beacon slot 7 (BSN7) in FIG. 5.

Since the beacon slot 0 (BSN0) and the beacon slot 8 and subsequent slots (BSN8 and subsequent BSNs) are not used, no parameter is described in these beacon slots.

FIG. 6 is a diagram schematically showing an example of the structure of a memory area in the memory, in which the beacon information concerning other network groups is stored, according to an embodiment of the present invention.

The beacon information concerning other network groups in beacon periods different from the beacon period of the own device is stored in the memory area in the memory in FIG. 6.

The beacon information that is received is stored in the memory for every beacon slot position 601.

The memory area in the memory includes a device index 602 indicating information specific to the communication device and a beacon status 603 indicating whether the beacon information is received in the beacon slot.

The beacon slot information 504 indicating the usage of the beacon slot in the beacon period, in the memory area in the memory in FIG. 5, is replaced with MAS information 604 on other groups at the MAS positions in a different beacon period in the memory area in the memory in FIG. 6. The memory area in the memory in FIG. 6 also includes the number of lost beacons 605 indicating a counted number of beacons that are temporarily lost.

A device address 606 described in a header in FIG. 6, and a device identifier 607 being information concerning the MAC address, a BSN 608, and control information 609, which are described in a beacon parameter in FIG. 6, are arranged as common information concerning the received beacon.

Furthermore, a received IE bitmap 610 indicating which information element is included; a BPOIE 611 indicating the usage of the beacon period; and a capability 612, which is the information element indicating the capability of the communication device 101, are arranged, if necessary, in an area (as IE parameters of the received beacon), in which parameters added as variable length information are stored. The BPOIE 611 and the capability 612 show the content of the information element described in the received IE bitmap 610. However, the structure of the memory area in the memory is not limited to the above example.

FIGS. 5 and 6 show that the structure in which the beacon information concerning the network group of the own device is stored in the memory is the same as the one in which the beacon information concerning other network groups is stored in the memory.

The information concerning the communication device 101-3 (DEVIV3) is stored in the memory on the basis of the parameters, for example, in the structure shown in FIG. 6.

The beacon information received by the communication device 101-3 is stored in the memory area in the memory as the information in a different beacon period.

The communication device 101-3 can receive the beacon information concerning the communication device 101-8 by receiving the beacon period of the communication device 101-8 because the communication device 101-8 (DEVID 8) operating in a different period is located near the communication device 101-3.

In other words, the information concerning the MAS position where the beacon is received, the beacon information, the beacon parameters, etc. are sequentially stored in the memory from the first position for other beacon periods.

The communication device that belongs to another network group and that communicates with the communication devices in the network group of the own device has DI=5 assigned as the device index 602.

Since the communication device 101 can determine the existence of the communication device 101-9 having another beacon period from the BPOIE indication from the communication device 101-8 (DEVID 8), the information concerning the communication device 101-9 may be stored in the memory area in the memory.

FIG. 7 is a diagram schematically showing an example of a management structure of the communication devices by using information specific to the communication device 101 (hereinafter referred to as device-specific information), according to an embodiment of the present invention.

The device-specific information is stored in the memory for collective management of all the communication devices 101 in the network group of the own device and, if necessary, communication devices 101 in a network group having the same beacon period as that of the network group of the own device or communication devices 101 in network groups having beacon periods different from the beacon period of the network group of the own device.

Even if the beacon slot position or the device address is changed, the parameters described for every device-specific information are used to identify one communication device 101.

Parameters shown in FIG. 7 are managed on the basis of the device specific information. The memory area in the memory, shown in FIG. 7, includes a device index (DI) status 702, a device address 703 corresponding to the device-specific information, transmission data buffering 704, an available MAS 705, a reserved MAS 706, a prioritized contention access (PCA) enabled MAS bitmap 707, an available rate 708, a hibernation count 709, a hibernation period 710, and other parameters, if necessary, for every device index 701. The device index 701 is a number corresponding to the device-specific information. The DI status 702 indicates the usage of the device-specific information. The transmission data buffering 704 indicates whether the transmission data is stored. The available MAS 705 is information concerning an available MAS position. The reserved MAS 706 is information concerning a reserved MAS position. The PCA enabled MAS bitmap 707 is information concerning the MAS position available for PCA communication. The available rate 708 is information concerning an available physical layer (PHY) data rate. The hibernation count 709 indicates a counted value of the superframe to a time when the communication device 101 enters a hibernation mode. The hibernation period 710 indicates the superframe period started in the hibernation mode. However, the management structure of the memory is not limited to the above one.

Figure 8:
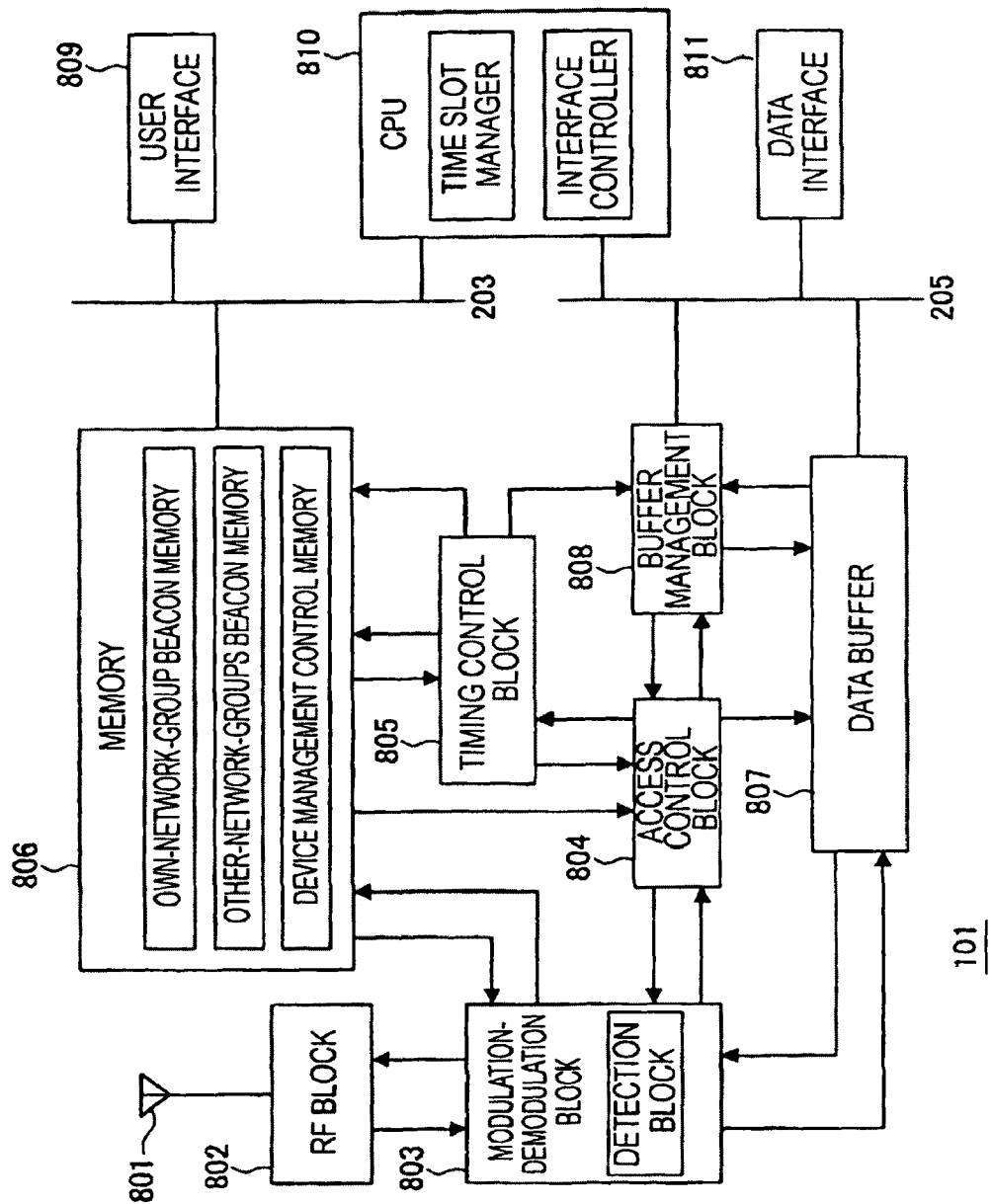
FIG. 8 is a block diagram schematically showing an example of the structure of a wireless communication device according to an embodiment of the present invention.

FIG. 8 is a block diagram schematically showing an example of the structure of a wireless communication device (communication device 101) according to an embodiment of the present invention.

Referring to FIG. 8, the communication device 101 includes an antenna 801, a radio-frequency (RF) block (a conversion unit) 802, and a modulation-demodulation block (a PHY block; including a detection unit, a storage unit, and a management unit) 803. The antenna 801 is used for transmitting and receiving a predetermined high-frequency radio signal through a wireless medium. The RF block 802 amplifies the received high-frequency signal to convert the amplified signal into a reception signal and amplifies a signal to be transmitted to convert the amplified signal into a high-frequency signal. The modulation-demodulation block 803 is a physical layer block that performs predetermined demodulation to a desired reception signal to generate an information bit and performs modulation to the information bit to be transmitted to generate a transmission signal.

The modulation-demodulation block 803 receives a signal, such as a beacon signal, through the antenna 801 to detect a wireless communication device having a different beacon period and/or to store the beacon information resulting from the demodulation of the beacon signal in an own-network-group beacon memory, an other-network-groups beacon memory, or a device management control memory using the device-specific information, which are memory areas in the memory 806 (storage unit).

The communication device 101 also includes an access control block 804 and a timing control block 805. The access control block 804 performs access control between the communication device 101 and peripheral communication devices 101 for wireless communication. The timing control block 805 controls timings of the access control for every predetermined slot (MAS).

The timing control block 805 corresponds to at least one of, for example, a scan setting unit, a management unit that modifies or updates (including new addition or deletion) the information concerning the device storage area, a calculation unit that calculates the timings, a comparison unit that compares the calculated timing of a reserved communication area with the timing of the reserved communication area of the own device, and a communication unit that sets the communication area.

The communication device 101 according to the embodiment of the present invention is characterized by including a memory 806 in which the own-network-group beacon memory, the other-network-groups beacon memory, the device management control memory, etc. are described. The own-network-group beacon memory is an area where beacon parameters transmitted from the communication devices 101 around the own device are stored in the beacon period of the network group of the own device. The other-network-groups beacon memory is an area where beacon parameters transmitted from the communication devices 101 around the own device are stored in a beacon period different from the beacon period of the network group of the own device. The device management control memory is an area where information used for managing the peripheral communication devices 101 with which the own device communicates by using the device-specific information is stored.

The communication device 101 further includes a data buffer 807 used for temporarily storing data that is received and data to be transmitted and a buffer management block 808 that accesses to the data buffer 807 and manages the memory areas in the data buffer 807.

The communication device 101 is provided with a user interface 809 that is connected to the communication device 101 through a beacon parameter list, an access parameter list, or a predetermined bus 203 and that performs predetermined input and output and a central processing unit (CPU) 810 incorporating programs used for controlling the communication device 101. The programs incorporated in the CPU 810 include a program used for controlling a time slot, an interface controller, and so on.

The CPU 810 may have a function of allocating a device identifier (device-specific information) unique to the communication device 101 from the information described in the memory 806.

The communication device 101 is further provided with a data interface 811 that is connected to the buffer management block 808 and the data buffer 807 through a predetermined bus 205, that passes data to application devices connected the communication device 101 at high speed, and that conforms to a high-speed serial bus standard, such as USB 2.0 or IEEE1394. The bus 205 is connected to the CPU 810 to cause the communication device 101 to perform a series of operations under the control of the CPU 810.

Figure 9:
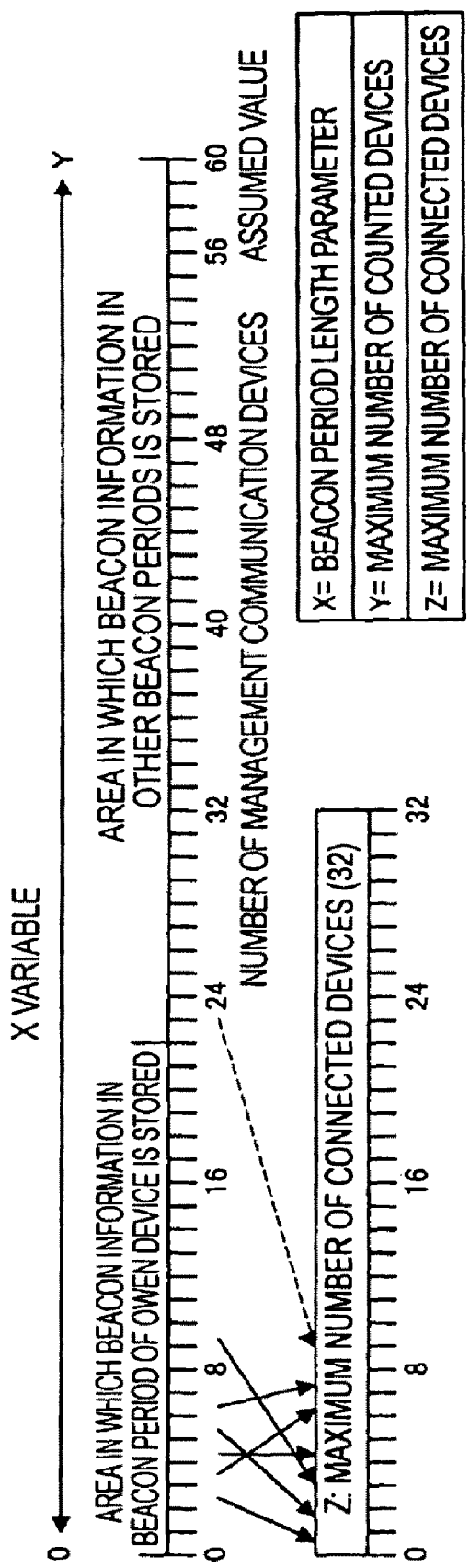
FIG. 9 is a diagram schematically showing management of communication devices around the own device, according to an embodiment of the present invention.

FIG. 9 is a diagram schematically showing management of the peripheral communication devices 101, according to an embodiment of the present invention.

As shown in FIG. 9, a beacon period length parameter (X) indicating the current setting for the beacon period, a maximum number of counted devices (Y), and a maximum number of connected devices (Z) are set for every communication device 101.

For example, it is assumed that the maximum number of counted devices (Y) is around 60. The beacon period length parameter (X) is set so as not to exceed the maximum number of counted devices (Y). The maximum number of counted devices (Y), etc. may be changed, if necessary.

In other words, the communication devices 101 of up to the maximum number of counted devices (Y), having the beacon period of the network group of the own device, can be included in the network.

The communication devices 101 of a number given by subtracting the value of the current beacon period length parameter (X) from the maximum number of counted devices (Y), having beacon periods different from the beacon period of the network group of the own device, can be added to the network.

The communication devices 101 that actually perform the communication are managed in accordance with the maximum number of connected devices (Z), and the device-specific information is allocated to the communication devices 101 in the network group of the own device, among the communication devices 101 having the beacon period of the own device. The communication devices 101 to which the device-specific information is allocated are included in the network.

It is assumed that the maximum number of connected devices (Z) is around 32. The communication devices that do not require monitoring of the state by unlimited access connections are discriminated.

The device-specific information is allocated as the parameters independent of the beacon slot position or the device address, as shown by arrows in FIG. 9.

If the communication devices 101 in other network groups or having different beacon periods communicate with the communication devices 101 in the network group of the own device, the device-specific information is allocated to those communication devices 101. The communication devices 101 to which the device-specific information is allocated are included in the network.

If the communication devices 101 having other beacon periods communicate with the communication devices 101 in the network group of the own device, as shown by a broken-line arrow in FIG. 9, the device-specific information may be allocated to the communication devices 101 having the other beacon periods.

Figure 10:
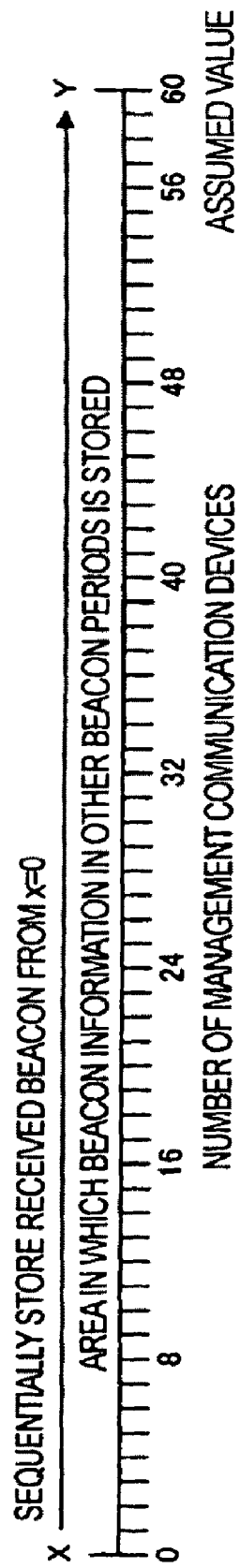
FIG. 10 is a diagram showing an example of the structure in which results of beacon scanning in initial setup are stored, according to an embodiment of the present invention.

FIG. 10 is a diagram showing an example of the structure in which results of beacon scanning in initial setup are stored, according to an embodiment of the present invention.

In this structure, all the areas in the superframe are used as the memory for storing the information in other beacon periods because the beacon period of the own device is not determined in the initial setup, for example, immediately after the communication device 101 is turned on or immediately after the communication device 101 is reset.

Since the reference superframe period has not been set in such a case, the reception operation of the beacon scanning is started at an arbitrary time and is continued until a predetermined superframe period.

Specifically, as shown in FIG. 10, the received beacon information is sequentially stored in the memory 806 from the first address (zero) of the storage area.

Information indicating how much offset time is necessary in the subsequent setting of the superframe period of the own device in order to store the beacon information from the beginning of the superframe can be yielded by also storing the received MAS positions in the memory 806.

Information indicating how much time difference there is between the communication devices 101 having different beacon periods can also be yielded.

Figure 11:
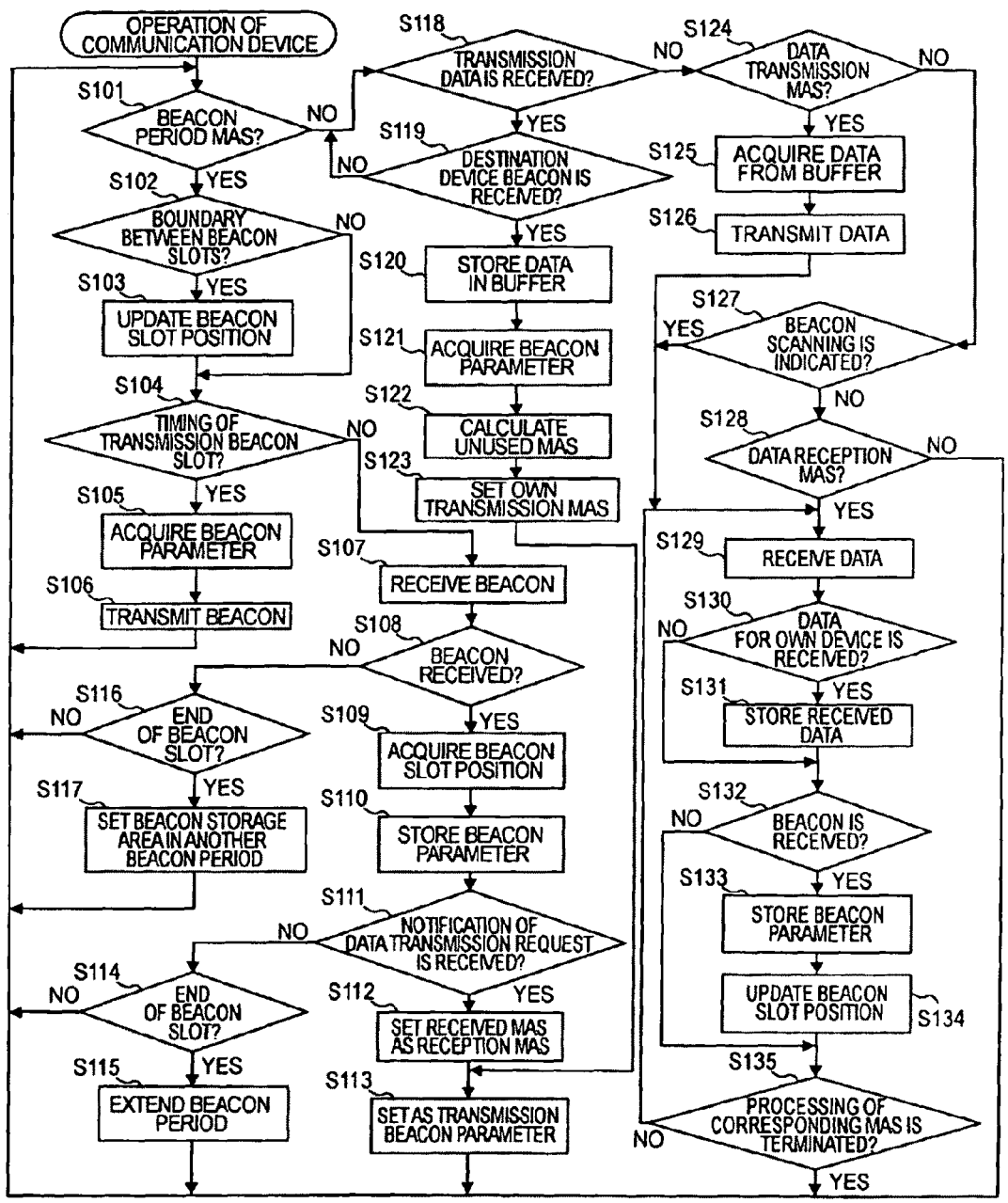
FIG. 11 is a flowchart schematically showing an operation of the communication device, according to an embodiment of the present invention.

FIG. 11 is a flowchart schematically showing an operation of the communication device 101, according to an embodiment of the present invention.

Each communication device 101 performs the operation in a manner set for every MAS at the start time of the MAS.

Referring to FIG. 11, in Step S101, the communication device 101 determines whether the MAS is in the beacon period. In Step S102, the communication device 101 determines whether it is the timing of a boundary between the beacon slots. If the communication device 101 determines in Step S101 that the MAS is in the beacon period and determines in Step S102 that it is the timing of a boundary between the beacon slots, then in Step S103, the communication device 101 updates the beacon slot position.

If the communication device 101 determines in Step S102 that it is not the timing of a boundary between the beacon slots, then in Step S104, the communication device 101 determines whether it is the timing of the transmission beacon slot. If the communication device 101 determines that it is the timing of the transmission beacon slot, then in Step S105, the communication device 101 acquires a beacon parameter. In Step S106, the communication device 101 transmits the beacon.

If the communication device 101 determines in Step S104 that it is not the timing of the transmission beacon slot, then in Step S107, the communication device 101 receives the beacon. In Step S108, the communication device 101 determines whether the beacon has been received. If the communication device 101 determines that the beacon has been received, then in Step S109, the communication device 101 acquires a position where the beacon slot is stored. In Step S110, the communication device 101 stores the received beacon parameter in memory area (having the structure shown in FIG. 5) in the memory 806, corresponding to the position of the beacon slot.

In Step S111, the communication device 101 determines whether a notification of a data transmission request is received for the beacon parameter. If the communication device 101 determines that a notification of the data transmission request is received for the beacon parameter, then in Step S112, the communication device 101 sets the specified MAS as the reception MAS. In Step S113, the communication device 101 sets this setting as the transmission beacon parameter of the own device.

If the communication device 101 determines in Step S111 that a notification of the data transmission request is not received for the beacon parameter, then in Step S114, the communication device 101 determines whether it is the end of the beacon slot. If the communication device 101 determines that it is the end of the beacon slot, then in Step S115, the communication device 101 extends the beacon period which the communication device 101 manages for a new communication device 101 because there is no room for the new communication device 101 that enters the network group in the beacon slot.

If the communication device 101 determines in Step S108 that the beacon has not been received, then in Step S116, the communication device 101 determines whether it is the end of the beacon slot. If the communication device 101 determines that it is the end of the beacon slot, then in Step S117, the communication device 101 sets the memory area (having the structure shown in FIG. 6) in another beacon period.

If the process in the beacon slot is terminated, the communication device 101 goes back to Step S101 and repeats the processing as long as the beacon MAS exists.

If the communication device 101 determines in Step S101 that the MAS is not in the beacon period, then in Step S118, the communication device 101 determines whether the transmission data has been received from an application device connected to the communication device 101 through the interface. If the communication device 101 determines that the transmission data has been received from an application device connected to the communication device 101 through the interface, then in Step S119, the communication device 101 determines whether a beacon has been received from the destination communication device. If the communication device 101 determines that a beacon has been received from the destination communication device, then in Step S120, the communication device 101 stores the data in the data buffer 807. In Step S121, the communication device 101 acquires a beacon parameter of the destination communication device. In Step S122, the communication device 101 calculates an unused MAS. In Step S123, the communication device 101 sets the calculated MAS as the transmission MAS of the own device. Then in Step S113, the communication device 101 sets the setting as the transmission beacon parameter of the own device.

If the communication device 101 determines in Step S118 that the transmission data has not been received, then in Step S124, the communication device 101 determines whether it is the transmission MAS to which the data transmission from the own device is set. If the communication device 101 determines that it is the transmission MAS to which the data transmission from the own device is set, then in Step S125, the communication device 101 acquires data from the data buffer 807. In Step S126, the communication device 101 transmits the data. After transmitting the data, the communication device 101 proceeds to Step S129, if necessary, and receives data during the remaining time of the MAS. The communication device 101 may receive acknowledgement (ACK) information, if necessary, and may perform automatic retransmission (not shown).

If the communication device 101 determines in Step S124 that it is not the transmission MAS to which the data transmission from the own device is set, then in Step S127, the communication device 101 determines whether the superframe where the beacon scanning is performed is set. If the communication device 101 determines that the superframe where the beacon scanning is performed is set, then in Step S128, the communication device 101 determines whether it is the reception MAS to which the data reception in the own device is set. If the communication device 101 determines that it is the reception MAS to which the data reception in the own device is set, then in Step S129, the communication device 101 receives the data. In Step S130, the communication device 101 determines whether data for the own device has been received. If the communication device 101 determines that data for the own device has been received, then in Step S131, the communication device 101 stores the data in the data buffer 807. The communication device 101 may transmit the ACK information back, if necessary (not shown).

In Step S132, the communication device 101 determines whether a beacon has been received, instead of the data. If the communication device 101 determines that a beacon has been received, than in Step S133, the communication device 101 stores the received beacon parameter in the memory area in the memory 806, where the current beacon list shown in FIG. 6 is stored, in another beacon period. In Step S134, the communication device 101 updates the memory area where information concerning the beacon, for example, information used for the management structure by using the device-specific information shown in FIG. 7, is stored.

In Step S135, the communication device 101 determines whether the processing of the corresponding MAS is terminated. If the communication device 101 determines that the processing of the corresponding MAS is not terminated, the communication device 101 goes back to Step S129 to repeat the reception processing.

If the communication device 101 determines in Step S135 that the processing of the corresponding MAS is terminated, the communication device 101 goes back to S101 to process the subsequent MAS.

If the corresponding MAS is not the beacon MAS, not the data transmission MAS, and not the data reception MAS, the communication device 101 goes back to Step S101 to repeat the above processing because the communication device 101 is in the hibernation mode in the corresponding MAS.

The above processing may be performed by dedicated hardware or by software. If the above processing is performed by software, the programs in the software are installed in an information processing apparatus, such as a general-purpose computer or a microcomputer, to cause the information processing apparatus to function as the communication device 101.

The above programs may be recorded in advance in a hard disk, a read only memory (ROM), or the like, which serves as a recording medium built in the computer.

Alternatively, the programs may be temporarily or permanently stored (recorded) in a removable recording medium, such as a flexible disk, a compact disc-read only memory (CD-ROM), a magneto-optical disc (MO), a digital versatile disk (DVD), a magnetic disk, or a semiconductor memory, in addition to the hard disk drive. Such a removable recording medium may be provided as package software.

The programs may be transferred from a web site to the computer through an artificial satellite for digital satellite broadcasting by radio waves or may be downloaded from a web site to the computer through a network, such as a local area network (LAN) or the Internet, by cables, in addition to the installation from the above removable recording medium to the computer. The computer receives the programs transferred in the above manner and installs the received programs in the hard disk built therein.

The steps describing the programs causing the computer to perform a variety of processing are not necessarily processed in time series in the order described in the flowchart in this specification. The steps may be performed in parallel or individually (for example, including a parallel process or an object process).

The wireless communication device according to the embodiment of the present invention has the following features.

Providing the area where the beacon information concerning the network group of the own device is stored and also providing the area where the beacon information concerning other network groups is stored allow the communication device 101 to manage the multiple network groups near the communication device 101.

The communication device 101 can efficiently collect the information from the communication devices in other network groups, around the communication device 101, by causing the area where the beacon information concerning other network groups is stored to have the same structure as that of the area where the beacon information concerning the network group of the own device is stored. Accordingly, it is possible to easily manage the ad hoc network by the autonomous distributed control.

Determining the maximum number of counted communication devices supported by the own device and sequentially storing the beacon information concerning the communication devices having different beacon periods from the end of the area where the beacon information in the beacon period of the own device is stored allow the communication device 101 to effectively use the limited memory space.

It is possible for the communication device 101 to efficiently collect the beacon information resulting from the initial scanning operation and the normal beacon information from the communication devices 101 in the network group of the own device.

Performing the scanning operation in a predetermined beacon period, in addition to the initial scanning operation, allows the communication device 101 to easily detect the presence of the networks or the communication devices having different beacon periods.

Collecting the beacon information concerning the communication devices 101 in different network groups, acquiring information concerning the communication areas used by the communication devices 101, and comparing the acquired communication areas with the communication area used by the own device allow the communication device 101 to change the settings such that the timings of the communication areas do not coincide with each other.

Collecting the beacon information concerning the communication devices 101 in different network groups, acquiring information concerning the communication areas used by the communication devices 101, and suppressing the transmission of the data from the own device at the timings included in the acquired information can provide an effective method of allowing the coexistence of the different networks.

Performing the management by using the device-specific information specific to the communication devices 101 allows the communication device 101 to use the parameters relating to the access control and the buffered data, without excluding such data, even if the beacon transmission position of a certain communication device is changed.

Individually providing the device-specific information having a length of about two bytes to manage each communication device 101 eliminates the need to use redundant information, such as the MAC addresses (eight bytes), for the management to identify the communication device 101, even if the identifier of the communication device 101 in the network is changed.

The use of the device-specific information allows simple determination of the destination communication device 101 that receives the data.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication device included in a first network group and having a first beacon period, the wireless communication device comprising:
scanning setup means for scanning at arbitrary timings, in addition to an initial scanning;
detecting means for detecting a second wireless communication device included in a second network group that does not include the wireless communication device and having a second beacon period different from the first beacon period;

memory means for storing beacon information corresponding to the second wireless communication device in a memory area, wherein the beacon information is stored in a first format and includes a header and a plurality of categorized sections for storing different types of data corresponding to the second beacon period;

calculating means for calculating a timing at which a reserved communication area of the second wireless communication device is set from at least the beacon information stored in the memory means;

comparing means for comparing the timing of the calculated reserved communication area with the timing of a reserved communication area of the wireless communication device; and setting means for setting the communication area of the wireless communication device such that the timing of the communication area of the wireless communication device does not coincide with the timing of the communication area of the second wireless communication device, in accordance with the comparison result.

2. The wireless communication device according to claim 1, wherein the memory means further stores beacon information corresponding to the wireless communication device, the beacon information corresponding to the wireless communication device being arranged in the first format.

3. The wireless communication device according to claim 1, wherein the memory means further stores beacon information resulting from the initial scanning, the beacon information resulting from the initial scanning being arranged in a first format, and the memory means stores beacon information corresponding to the wireless communication device, the beacon information corresponding to the wireless communication device being arranged in the first format.

4. The wireless communication device according to claim 2, further comprising setting means for setting a maximum number of counted communication devices in the first network and the second network, wherein the memory means sequentially stores the beacon information corresponding to the second wireless communication device and the beacon information corresponding to the wireless communication device.

5. The wireless communication device according to claim 1, further comprising:
allocating means for allocating a device identifier specific to each of a plurality of wireless communication devices around the wireless communication device; and
managing means for managing the plurality of wireless communication devices, which are destination devices, by using the device identifier.

6. A wireless communication method for a wireless communication device included in a first network group having a first beacon period, the method comprising:
scanning at arbitrary timings, in addition to an initial scanning;
detecting a second wireless communication device included in a second network group that does not include the wireless communication device and having a second beacon period different from the first beacon period;
storing beacon information corresponding to the second wireless communication device in a memory area, wherein the beacon information is stored in a first format and includes a header and a plurality of categorized sections for storing different types of data corresponding to the second beacon period;
calculating a timing at which a reserved communication area of the second wireless communication device is set from at least the stored beacon information;
comparing the timing of the calculated reserved communication area with the timing of a reserved communication area of the wireless communication device; and
setting the communication area of the wireless communication device such that the timing of the communication area of the wireless communication device does not coincide with the timing of the communication area of the second wireless communication device, in accordance with the comparison result.

7. A non-transitory computer-readable medium storing instructions, which, when executed by a processor of a wireless communication device included in a first network group having a first beacon period, causes the processor to perform a method comprising:
scanning at arbitrary timings, in addition to an initial scanning;
detecting a second wireless communication device included in a second network group that does not include the wireless communication device and having a second beacon period different from the first beacon period;
storing beacon information corresponding to the second wireless communication device in a memory area, wherein the beacon information is stored in a first format and includes a header and a plurality of categorized sections for storing different types of data corresponding to the second beacon period;
calculating a timing at which a reserved communication area of the second wireless communication device is set from at least the stored beacon information;
comparing the timing of the calculated reserved communication area with the timing of a reserved communication area of the wireless communication device; and
setting the communication area of the wireless communication device such that the timing of the communication area of the wireless communication device does not coincide with the timing of the communication area of the second wireless communication device, in accordance with the comparison result.

8. A wireless communication device included in a first network group and having a first beacon period, the wireless communication device comprising:
a scanning setup unit configured to scan at arbitrary timings, in addition to an initial scanning;
a detection unit configured to detect a second wireless communication device included in a second network group that does not include the wireless communication device and having a second different beacon period different from the first beacon period;
a memory unit configured to store beacon information corresponding to the second wireless communication device in a memory area, wherein the beacon information is stored in a first format and includes a header and a plurality of categorized sections for storing different types of data corresponding to the second beacon period;
calculating unit for calculating a timing at which a reserved communication area of the second wireless communication device is set from at least the beacon information stored in the memory means;
comparing unit for comparing the timing of the calculated reserved communication area with the timing of a reserved communication area of the wireless communication device; and
setting unit for setting the communication area of the wireless communication device such that the timing of the communication area of the wireless communication device does not coincide with the timing of the communication area of the second wireless communication device, in accordance with the comparison result.

* * * * *